United States Patent
Gignac et al.

(10) Patent No.: US 10,582,136 B2
(45) Date of Patent: Mar. 3, 2020

(54) CAMERA APPARATUS AND OPERATING METHOD THEREOF

(71) Applicant: GM GLOBAL TECHNOLOGY OPERATIONS LLC, Detroit, MI (US)

(72) Inventors: Donald R. Gignac, Waterford, MI (US); Allan K. Lewis, Windsor (CA); Mohammad Naserian, Windsor (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/928,328

(22) Filed: Mar. 22, 2018

(65) Prior Publication Data

US 2019/0297277 A1   Sep. 26, 2019

(51) Int. Cl.
*H04N 5/33* (2006.01)
*H04N 5/235* (2006.01)
*H04N 5/225* (2006.01)

(52) U.S. Cl.
CPC .......... *H04N 5/332* (2013.01); *H04N 5/2256* (2013.01); *H04N 5/2354* (2013.01); *H04N 5/2355* (2013.01)

(58) Field of Classification Search
CPC .... H04N 5/332; H04N 5/2256; H04N 5/2355; H04N 5/2354
See application file for complete search history.

(56) References Cited

U.S. PATENT DOCUMENTS

| | | | |
|---|---|---|---|
| 6,201,642 B1* | 3/2001 | Bos | B60R 1/00 359/504 |
| 6,621,616 B1* | 9/2003 | Bauer | H04N 5/2254 250/338.4 |
| 2003/0122930 A1* | 7/2003 | Schofield | B60R 1/00 348/148 |
| 2004/0091133 A1* | 5/2004 | Monji | H04N 5/332 382/104 |
| 2005/0074221 A1* | 4/2005 | Remillard | H04N 5/2354 385/147 |
| 2006/0171704 A1* | 8/2006 | Bingle | H04N 5/2252 396/419 |
| 2007/0278406 A1* | 12/2007 | Haug | H04N 5/33 250/338.1 |
| 2015/0035977 A1* | 2/2015 | Schrepfer | H04N 5/44 348/143 |
| 2015/0358540 A1* | 12/2015 | Kanter | H04N 5/23238 348/38 |

* cited by examiner

*Primary Examiner* — Jason A Flohre

(57) ABSTRACT

A camera apparatus is provided. The apparatus includes an image sensor, an electrochromic filter element, an infrared illuminator, and a controller configured to activate at least one from among the electrochromic filter element and the infrared illuminator based on a feature of an image of a scene captured by the image sensor.

19 Claims, 4 Drawing Sheets

CAMERA APPARATUS AND OPERATING METHOD THEREOF

INTRODUCTION

Apparatuses and methods consistent with exemplary embodiments relate to cameras. More particularly, apparatuses and methods consistent with exemplary embodiments relate to camera apparatuses optimized for various lighting conditions.

SUMMARY

One or more exemplary embodiments provide a camera apparatus that includes an electrochromic filter layer sensitive to both infrared (IR) and color spectrums. More particularly, one or more exemplary embodiments provide a camera with an electrochromic filter element to provide an IR cut filter when active and to pass a full spectrum of light when inactive.

According to an exemplary embodiment, a camera apparatus is provided. The apparatus includes an image sensor, an electrochromic filter element, an infrared illuminator; and a controller configured to activate one or more from among the electrochromic filter element and the infrared illuminator based on a feature of an image of a scene captured by the image sensor. The image sensor may be a camera or a video camera.

The controller may be configured to activate one or more from among the electrochromic filter element and the infrared illuminator by analyzing the image captured by the image sensor and determining the scene is a nighttime scene.

The controller may determine the scene is the nighttime scene if a contrast of the image corresponds to a predetermined threshold corresponding to a nighttime image.

The controller may be configured to control the image sensor to capture a second image of the scene after activating one or more from among the electrochromic filter element and the infrared illuminator.

The apparatus may also include a video transport configured to transport the second image captured to by the image sensor to one or more from among a display and an image processor.

The controller may be configured to activate both the electrochromic filter element and the infrared illuminator in response to determining the scene is the nighttime scene.

The electrochromic filter element may be configured to allow light transmission wavelength of 100 nm to 1000 nm in response to being activated.

The electrochromic filter element may be configured to allow light transmission wavelength of 380 nm to 770 nm when deactivated.

The controller may be a vehicle electronic controller unit.

The apparatus may also include an acrylic lens, and the electrochromic filter element may be disposed between the acrylic lens and the image sensor.

The apparatus may also include a plurality of optic coupling layers disposed between the acrylic lens and the electrochromic filter element.

The apparatus may also include a neutral density filter disposed between the plurality of optic coupling layers.

The apparatus may also include an ambient light sensor, and the controller may be configured to activate one or more from among the electrochromic filter element and the infrared illuminator based on luminance information provided by the ambient light sensor.

The apparatus may also include a mount configured to attach the electrochromic filter element to a vehicle body. The mount may include a hole corresponding to a lens of an image sensor, and a recess configured to hold the electrochromic filter element.

According to an exemplary embodiment, a camera apparatus is provided. The apparatus includes an image sensor, an ambient light sensor, an electrochromic filter element, an infrared illuminator, and a controller configured to activate one or more from among the electrochromic filter element and the infrared illuminator based on luminance information provided by the ambient light sensor, and control the image sensor to capture an image.

According to an exemplary embodiment, a method of operating a camera is provided. The method includes sampling a first image of a scene, determining whether the sampled first image contains a nighttime scene, activating one or more from among an electrochromic filter layer and an infrared illuminator in response to determining that the sampled first image includes a nighttime scene, and capturing a second image of the scene using the activated one or more from among the electrochromic filter layer and the infrared illuminator.

The determining whether the sampled first image contains the nighttime scene may include analyzing a contrast of the image to determine if the contrast corresponds to a predetermined threshold corresponding to a nighttime image. The sampling the first image of the scene and the capturing the second image may be performed by a camera.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
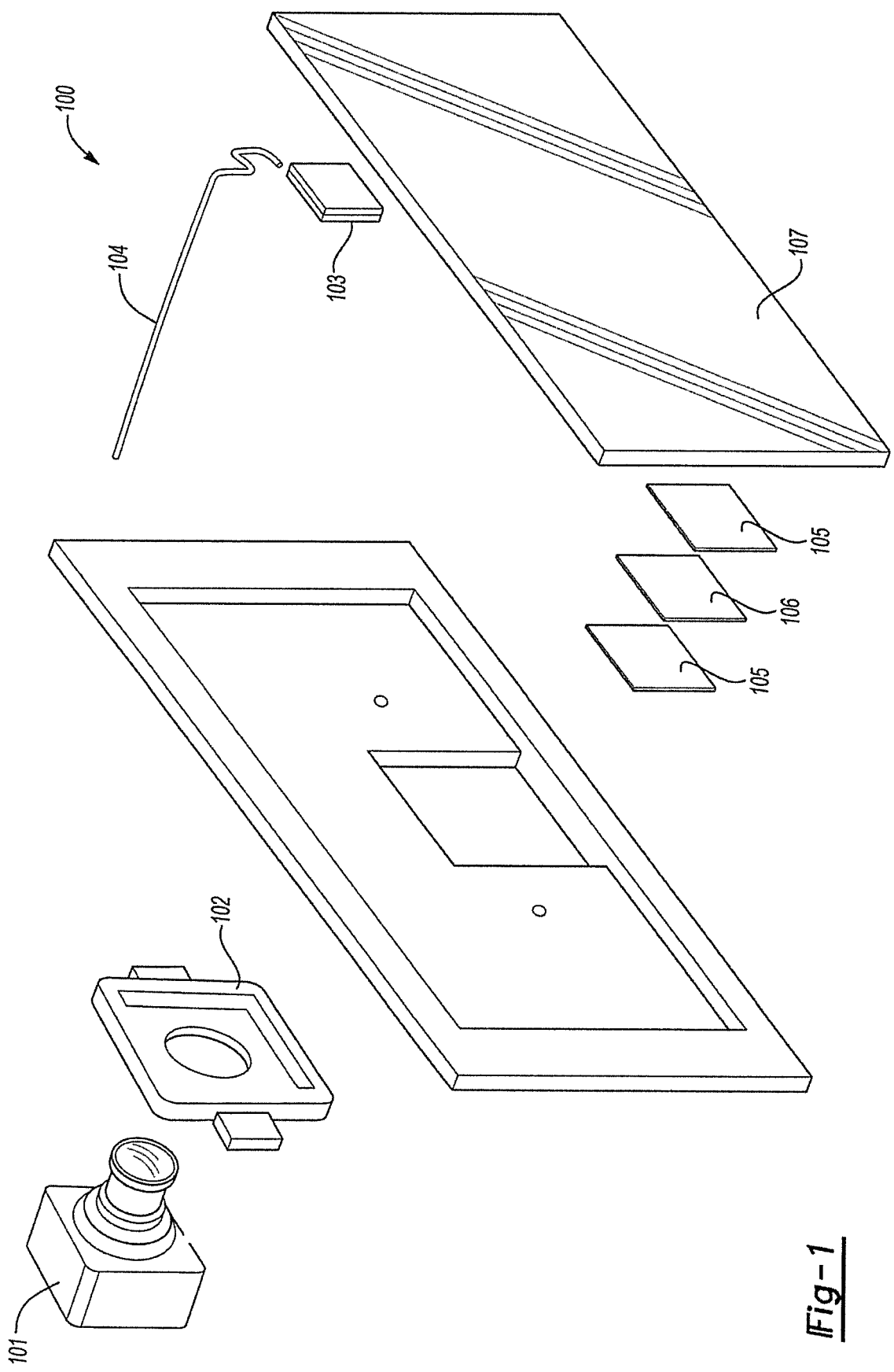
FIG. 1 shows an illustration of a camera apparatus according to an exemplary embodiment.

A camera apparatus and operating method thereof will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

FIG. 1 shows an illustration of a camera apparatus 100 according to an exemplary embodiment. Referring to FIG. 1, an exploded view diagram of the camera apparatus 100 is shown.

A camera 101 may be mounted to vehicle body (not shown) using mount 102 and facing an exterior area around the vehicle. An electrochromic filter element 103 may be disposed between the camera 101 and a lens 107. The electrochromic filter element 103 may include an electrochromic infrared filter element.

The camera 101 may be an image sensor or a complete camera capable of capturing both video and still images. The camera may be connected to and controlled by its own controller or an external controller such as a vehicle electronic controller unit (ECU) (not shown).

One or more optical coupling elements 105 may be disposed between the electrochromic filter element 103 and lens 107. Moreover, a neutral density filter 106 may be disposed between the electrochromic filter element 103 and lens 107. According to one example, the neutral density filter 106 may be disposed between a first and second optical coupling element 105.

The lens 107 may be an acrylic or glass lens and may be inserted on the exterior of the vehicle body. An electrochromic element wire 104 may be used to send/receive control signals or information to/from a controller (e.g., a vehicle ECU) (not shown).

The electrochromic filter element 103, optical coupling elements 105, and/or the neutral density filter 106 may be disposed in a recess of the mount 102 and may be aligned with an opening in a vehicle body that is covered by lens 107.

Figure 2:
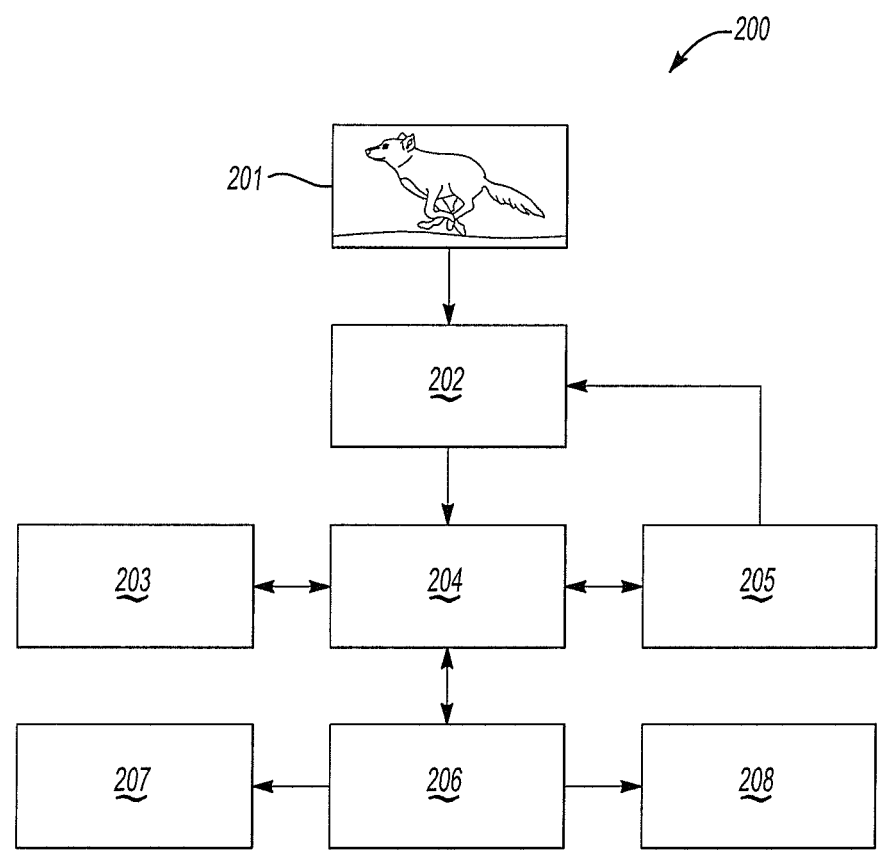
FIG. 2 shows a diagram of a camera apparatus according to an exemplary embodiment.

FIG. 2 shows a diagram of a camera apparatus 200 according to an exemplary embodiment. Referring to FIG. 2, a scene 201 may be captured by the camera apparatus 200, which is similar to the camera apparatus 100.

The image sensor 204 captures visible light and/or infrared that reflects off the scene 201 and travels through the electrochromic filter element 202. The controller 205 may switch, activate or deactivate, or otherwise control electrochromic filter element 202 and the infrared illuminator 203.

In particular, the controller 205 (i.e., filter layer controller) may be configured to determine one or more from among whether it is daytime or nighttime and whether there is sufficient ambient light or insufficient ambient light. The determination of whether it is daytime or nighttime and whether there is sufficient ambient light or insufficient ambient light may be performed by analyzing information on luminance output by an ambient light sensor provided via a vehicle bus such as a controller area network (CAN) bus and/or by analyzing an image provided by image sensor 204.

The image sensor 204 may include an array of photo sensors captures the light that passes through the electrochromic filter element 202 and converts that to electrical charges. The sensor may include one or more from among a pinned photodiode, a p-n junction photodiode, a Schottky photodiode, a photogate, or any other suitable photo conversion device or device that may accumulate and/or store photo charges. The infrared illuminator 203 may include an infrared light configured to illuminate the scene 201 by directing the infrared light at the scene 201.

The video transport 206 may transport image data from the image sensor to an image processor 208 (e.g., an image processing ECU) or display 207. The video transport 206 may include one or more from among a parallel or serialized MIPI-CSI2 interface, an LVDS serializer or analog encoder, a coax cable or twisted pair wiring, an LVDS deserializer or analog decoder, a receiving chipset configured for machine vision or preparation for display. For example, image data captured from image sensor is output either through a parallel or serialized MIPI-CSI2 interface or another suitable interface. The image data may then be routed to LVDS serializer or analog encoder via coax cable or twisted pair wiring. Next, the image data may be received by LVDS deserializer or analog decoder and sent across a board to receiving chipset for machine vision or preparation for display. In addition, the image data may be serialized again and transmitted through LVDS serializer or analog encoder to LVDS deserializer or analog decoder.

The image processor 208 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components. The display 207 may include one or more from among a display, a centrally-located display, a head up display, a windshield display, liquid crystal display, organic light emitting diode display, etc.

The image data may also be stored on one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

Figure 3:
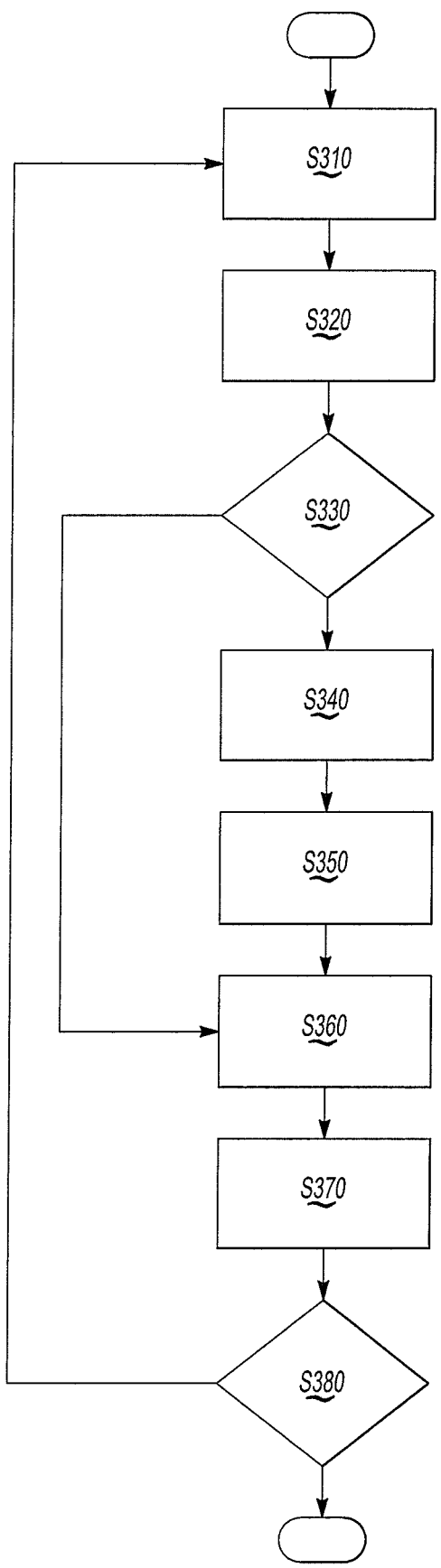
FIG. 3 shows a flow diagram of an operating method of a camera apparatus according to an exemplary embodiment.

FIG. 3 shows a flow diagram of an operating method of a camera apparatus according to an exemplary embodiment. The method of FIG. 3 may be performed by the camera apparatus 100 or may be encoded into a computer readable medium as instructions that are executable by a computer to perform the method.

Referring to FIG. 3, a scene is sampled by capturing a first image of the scene to determine the illumination of the scene in operation S310. In operation S320, the scene contrast is analyzed by analyzing pixels in the captured first image. In one example, the histogram response of pixel intensity values of the scene is evaluated, and if the average histogram response is below a calibrated threshold, it is determined to be in nighttime. In another example, the image is converted to a gray scale image, pixel intensities of the gray scale image are evaluated to determine pixel hot spots (illumination sources) to remove those pixels corresponding to hotspots, the pixel intensities are averaged, and it is determined if the calculated value is below a predetermined low ambient light intensity value signifying night time using a predetermined feature vector.

In operation S330, the contrast of the first image is compared to a predetermined threshold that indicates whether the scene is a nighttime scene and it is determined whether a scene is a nighttime scene, has insufficient light or has insufficient ambient light. If the contrast of the first image corresponds to the predetermined threshold (operation S330—Yes), the process proceeds to operations S340 and S350 where the electrochromic filter element is activated and an infrared illuminator is activated to illuminate the scene. If the contrast of the first image does not correspond to the predetermined threshold (operation S330—No), the scene is a daytime scene, has sufficient light or has sufficient ambient light and the process proceeds to operation S360 to acquire the second image.

After the electrochromic filter element is activated in operation S340, the electrochromic filter element allows light between around 100 nm and around 1000 nm to pass through to the image sensor or camera. In addition, in operation S350, an infrared illuminator may illuminate the scene by directing an infrared light at the scene. If the electrochromic filter element is deactivated, e.g., when the method skips to operation S360, the electrochromic filter element allows light between around 380 nm and around 770 nm to pass through to the image sensor or camera.

In operation S360, a second or final image of the scene is acquired by the camera or image sensor using the appropriate configuration or activation state of the infrared illuminator and the electrochromic element that corresponds to the type of scene. The second image is output to a controller, image processor, or vehicle ECU for image processing and/or display in operation S370. Then, in operation S380, it is determined whether the camera is still in an active state or still requested to run. If the camera is no longer active or an image is not requested (operation S380—No), the process ends. Otherwise, if the camera is required to be active or an image is requested, the process returns to operation S310.

Figure 4:
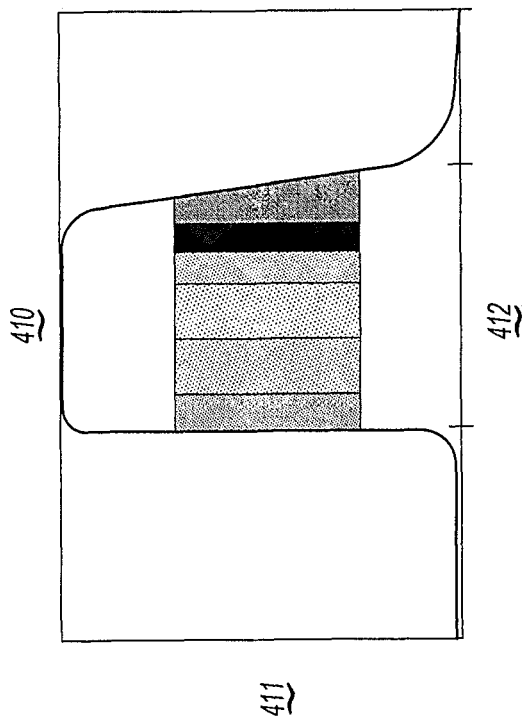
FIG. 4 shows illustrations of an operation of a camera apparatus according to an aspect of an exemplary embodiment.
Figure 4:
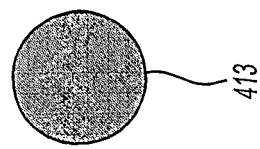
Figure 4:
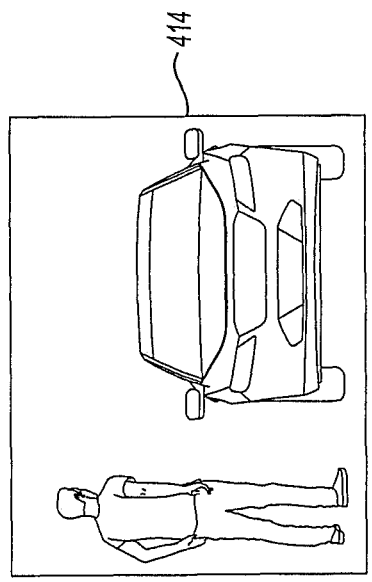
Figure 4:
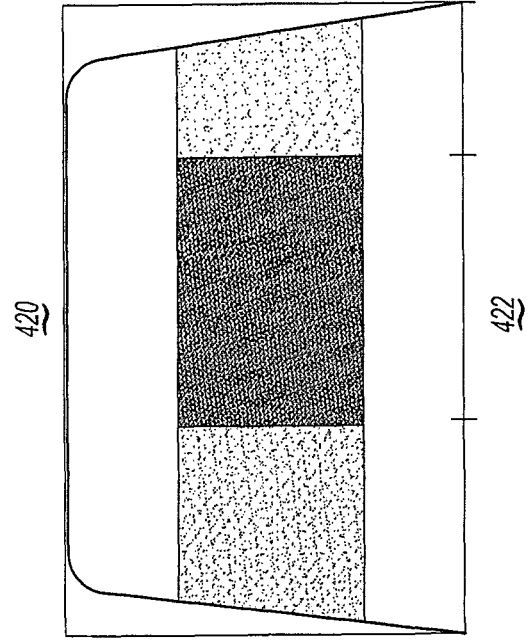
Figure 4:
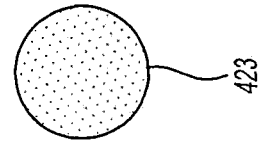
Figure 4:
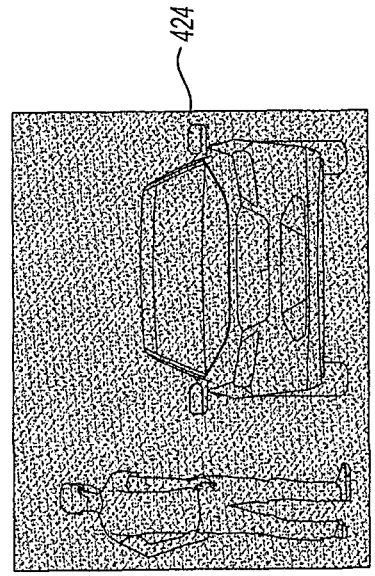

FIG. 4 shows illustrations of an operation of a camera apparatus 100 according to an aspect of an exemplary embodiment. Referring to FIG. 4, the configuration and operation of the camera apparatus 100 is illustrated under nighttime or insufficient light and daytime or sufficient light conditions.

Graph 410 shows the operation of electrochromic element 413 during daytime, a period when there is sufficient light, or in an area where there is sufficient light as illustrated in image 414. In graph 410, the light transmission 411 (shown on the y-axis) at respective wavelengths (nm) 412 (shown on x-axis) occurs between 380 nm and 770 nm, whereas light transmission between 100-379 nm and 771-1000 nm wavelengths is negligible. This band of 380-770 nm light transmission is light transmission allowed when the electrochromic element 413 is in a deactivated state or a first state.

Graph 420 shows the operation of electrochromic element 423 during nighttime, a period when there is insufficient light, or in an area where there is insufficient light as illustrated in image 424. In graph 420, the light transmission 421 (shown on the y-axis) at respective wavelengths (nm) 422 (shown on x-axis) occurs between 100 nm and 1000 nm. This band of 100 nm and 1000 nm light transmission is light transmission allowed when the electrochromic element 423 is in an activated state or a second state. Moreover, this band of 100 nm and 1000 nm light transmission may supplemented by the introduction of infrared illumination generated by an infrared illuminator working in conjunction with the active electrochromic element 423. One or more illuminators may be used and may illuminate with infrared light of different wavelengths.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:
1. A camera apparatus, the apparatus comprising:
an image sensor;
an electrochromic filter element;
an infrared illuminator; and
a controller configured to activate at least one from among the electrochromic filter element and the infrared illuminator based on a feature of an image of a scene captured by the image sensor,
wherein the electrochromic filter element is configured to allow a light transmission wavelength of 100 nm to 1000 nm in response to being activated.
2. The apparatus of claim 1, wherein the controller is configured to activate at least one from among the electrochromic filter element and the infrared illuminator by analyzing the image captured by the image sensor and determining the scene is a nighttime scene.
3. The apparatus of claim 2, wherein the controller determines the scene is the nighttime scene if a contrast of the image corresponds to a predetermined threshold corresponding to a nighttime image.
4. The apparatus of claim 2, wherein the controller is configured to control the image sensor to capture a second image of the scene after activating at least one from among the electrochromic filter element and the infrared illuminator.
5. The apparatus of claim 4, further comprising a video transport configured to transport the second image captured to by the image sensor to at least one from among a display and an image processor.
6. The apparatus of claim 2, wherein the controller is configured to activate both the electrochromic filter element and the infrared illuminator in response to determining the scene is the nighttime scene.
7. The apparatus of claim 1, wherein the electrochromic filter element is configured to allow light transmission wavelength of 380 nm to 770 nm when deactivated.
8. The apparatus of claim 1, wherein the controller comprises a vehicle electronic controller unit.
9. The apparatus of claim 1, further comprising an acrylic lens,
wherein the electrochromic filter element is disposed between the acrylic lens and the image sensor.
10. The apparatus of claim 9, further comprising a plurality of optic coupling layers disposed between the acrylic lens and the electrochromic filter element.
11. The apparatus of claim 10, further comprising a neutral density filter disposed between the plurality of optic coupling layers.
12. The apparatus of claim 1, further comprising an ambient light sensor,
wherein the controller is configured to activate at least one from among the electrochromic filter element and the infrared illuminator based on luminance information provided by the ambient light sensor.

13. The apparatus of claim 1, further comprising a mount configured to attach the electrochromic filter element to a vehicle body.

14. The apparatus of claim 13, wherein the mount comprises a hole corresponding to a lens of the image sensor, and a recess configured to hold the electrochromic filter element.

15. The apparatus of claim 1, wherein the image sensor comprises a camera.

16. A camera apparatus, the apparatus comprising:
   a lens;
   an image sensor;
   an ambient light sensor;
   an electrochromic filter element;
   an infrared illuminator;
   a plurality of optic coupling layers disposed between the lens and the electrochromic filter element; and
   a controller configured to activate at least one from among the electrochromic filter element and the infrared illuminator based on luminance information provided by the ambient light sensor, and control the image sensor to capture an image.

17. A method for operating a camera, the method comprising:
   sampling a first image of a scene;
   determining whether the sampled first image contains a nighttime scene;
   activating an electrochromic filter layer configured to allow a light transmission wavelength of 100 nm to 1000 nm when being activated and an infrared illuminator in response to determining that the sampled first image includes a nighttime scene; and
   capturing a second image of the scene using the activated electrochromic filter layer and the infrared illuminator.

18. The method of claim 17, wherein the determining whether the sampled first image contains the nighttime scene includes analyzing a contrast of the sampled first image contains image to determine if the contrast corresponds to a predetermined threshold corresponding to a nighttime image.

19. The method of claim 17, wherein the sampling the first image of the scene and the capturing the second image is performed by a camera.

* * * * *